US005502837A

United States Patent [19]

Hoffert

[11] Patent Number: 5,502,837

[45] Date of Patent: Mar. 26, 1996

[54] METHOD AND APPARATUS FOR CLOCKING VARIABLE PIXEL FREQUENCIES AND PIXEL DEPTHS IN A MEMORY DISPLAY INTERFACE

[75] Inventor: Bradley W. Hoffert, Mountain View, Calif.

[73] Assignee: Sun Microsystems, Inc., Mountain View, Calif.

[21] Appl. No.: 928,513

[22] Filed: Aug. 11, 1992

[51] Int. Cl.[6] .............................. G09G 1/28; G06F 1/12; G06F 1/04

[52] U.S. Cl. .......................... 395/550; 395/162; 364/270; 364/DIG. 1; 364/926; 364/927.2; 364/DIG. 2

[58] Field of Search .................................... 395/162, 550; 345/199, 200, 208

[56] References Cited

U.S. PATENT DOCUMENTS 5,371,517 12/1994 Izzi et al. ................................ 345/199

OTHER PUBLICATIONS

Birman et al., IEEE 1991 Custom Integrated Circuts Conference, "100 Mpixel/sec single–chip integrated graphics controller (IGC)", pp. 16.5.1–16.5.4.

Schnaitter et al., IEEE 1991 Custom Integrated Circuts Conference, "170 Mhz CMOS Pixel Processor for Windowing Graphics", pp. 16.6.1–16.6.4.

Leonard et al., IEEE Journal of Solid–State Circuits, "A 66–MHz DSP–augmented RAMDAC for Smooth–Shaded Graphic Applications", v. 26 No. 3 1991, pp. 217–228.

Gutierrez et al., IEEE 1990 Custom Integrated Circuts Conference, "An Integrated PLL Clock Generator for 275 MHz Graphic Displays", pp. 15.1.1–15.1.4.

*Primary Examiner*—Thomas C. Lee
*Assistant Examiner*—D. Dinh
*Attorney, Agent, or Firm*—Blakely Sokoloff Taylor & Zafman

[57] ABSTRACT

A method and apparatus for synchronizing pixel data flow within a memory display interface (MDI) to enable variable pixel depths, and to support display devices requiring differing pixel rates. A clock circuit receives a pixel clock from a DAC, and generates a shift clock (VSCLK), a pipeline clock, and an input control signal, all of which are synchronized to the pixel clock. The pixel clock synchronizes color pixel data transfer from the MDI to the DAC. The pipeline clock synchronizes pixel data processing through a pixel processing pipeline according to the frequency of the pixel clock and the number of pixels processed in parallel through the pixel processing pipeline. The input control signal feeds the pixel data from a VRAM frame buffer into the pixel processing pipeline according to the pixel depth mode, the frequency of the pixel clock, and the number of pixels processed in parallel through the pixel processing pipeline. The VSCLK controls pixel data transfer from the VRAM frame buffer over the video bus according to the pixel depth mode and the frequency of the pixel clock.

16 Claims, 4 Drawing Sheets

METHOD AND APPARATUS FOR CLOCKING VARIABLE PIXEL FREQUENCIES AND PIXEL DEPTHS IN A MEMORY DISPLAY INTERFACE

BACKGROUND OF THE INVENTION

1. Field of the Invention

This invention relates to the system architecture of a computer graphics display system. More particularly this invention relates to clock circuits for sequencing pixel data in a memory display interface.

2. Art Background

In a typical computer graphics system, a frame buffer comprised of video random access memory (VRAM) stores pixel data for a display device. Usually the VRAM frame buffer is coupled to a RAMDAC device, which implements look-up table and digital to analog converter functions. The look-up tables of the RAMDAC convert pixel data received from the VRAM frame buffer into color pixel data. The digital to analog converter of the RAMDAC converts the color pixel data into analog video signals for the display device. However, a RAMDAC device usually requires a fixed pixel rate for the display device, and a fixed pixel depth for the pixel data stored in the frame buffer.

A computer graphics system may employ a memory display interface coupled to a digital to analog converter, rather than a RAMDAC device, to improve pixel processing flexibility. A memory display interface processes pixel data at programmable pixel rates and pixel depths, and implements special pixel functions. Pixel processing at programmable pixel rates enables support of display devices having differing resolutions, and support of VRAM frame buffers having differing access speeds. Processing of pixels having programmable pixel depths within the VRAM frame buffer increases software compatibility.

However, the synchronization of pixel data processing within the memory display interface is complicated by the variable pixel rates and pixel depths. Clock signals for synchronizing pixel data flow through the memory display interface must be generated for a wide range of frequencies. Moreover, the clock signals must have a known relationship to the video clock that synchronizes the video signals. Fixed delay circuits used in the past to meet set up and hold requirements of the various circuit elements may work at one frequency, but not at other frequencies. The problem is made worse by the fact that the speed of circuit elements varies with temperature, voltage, and process of manufacturer.

As will be described, the present invention is a method and apparatus for synchronizing pixel data flow within a memory display interface supporting programmable pixel depths, and supporting display devices requiring differing pixel rates.

SUMMARY OF THE INVENTION

A method and apparatus is disclosed for synchronizing pixel data flow within a memory display interface (MDI) supporting variable pixel depths, and supporting display devices requiring differing pixel rates. The MDI receives pixel data from a VRAM frame buffer over a video bus, and performs look-up table functions and special pixel functions on the pixel data. Color pixel data from the MDI is transferred to a digital to analog converter (DAC), which generates video signals for a display device. Pixel data for multiple pixels is transferred in parallel from the VRAM frame buffer to the MDI over the video bus, according to a pixel depth mode.

The MDI has an input circuit, a pixel processing pipeline, and a clock circuit. The input circuit receives pixel data over the video bus, and feeds the pixel processing pipeline. The clock circuit receives a pixel clock from the DAC, and generates a shift clock (VSCLK), a pipeline clock, and an input control signal, all of which are synchronized to the pixel clock. The VSCLK, the pipeline clock, the input control signal, and the pixel clock are derived from a video clock. The frequencies generated by the clock circuit are determined by the pixel rate required by the display device, and by the pixel depth mode. The pixel rate required by the display device is determined by the frequency of the video clock.

The pixel clock synchronizes color pixel data transfer from the MDI to the DAC. The pipeline clock synchronizes pixel data processing through the pixel processing pipeline according to the frequency of the pixel clock and the number of pixels processed in parallel through the pixel processing pipeline. The input control signal feeds the pixel data from the VRAM frame buffer into the pixel processing pipeline according to the pixel depth mode, the frequency of the pixel clock, and the number of pixels processed in parallel through the pixel processing pipeline. The VSCLK controls pixel data transfer from the VRAM frame buffer over the video bus according to the pixel depth mode and the frequency of the pixel clock.

DETAILED DESCRIPTION OF THE INVENTION

A method and apparatus is disclosed for synchronizing pixel data flow within a memory display interface to enable variable pixel depths, and to support display devices requiring differing pixel rates. In the following description, for purposes of explanation, specific circuit devices, circuit architectures and components are set forth in order to provide a more thorough understanding of the present invention. However, it will be apparent to one skilled in the art that the present invention may be practiced without the specific details. In other instances while known circuits and devices are shown in schematic form in order not to obscure the present invention unnecessarily.

Figure 1:
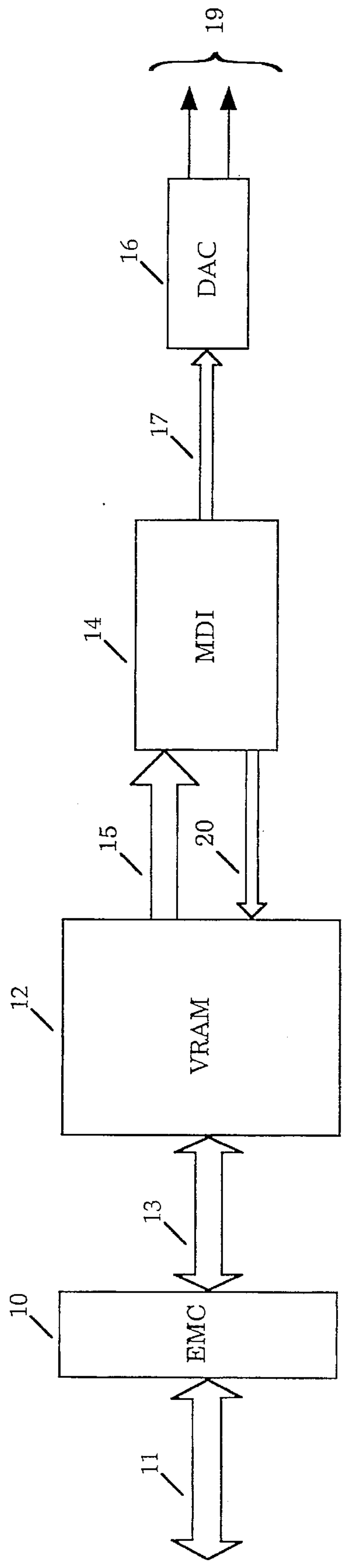
FIG. 1 is a block diagram of a VRAM frame buffer and a memory display interface that employs the teachings of the present invention.

Referring now to FIG. 1, a block diagram of a VRAM frame buffer and a memory display interface that employs the teachings of the present invention is shown. An error correction coding memory controller (EMC) 10 is illustrated coupled to a microprocessor bus 11. The EMC 10 functions as a memory controller for a VRAM frame buffer 12. The VRAM frame buffer 12 is a frame buffer for pixel data transferred over the microprocessor bus 11, or generated by an optional enhanced pixel processing memory controller. The EMC 10 communicates with the VRAM frame buffer 12 over a memory bus 13.

A memory display interface (MDI) 14 performs look-up table functions and special pixel functions on the pixel data transferred from the VRAM frame buffer 12, through the MDI 14, to a digital to analog converter (DAC) 16. In particular, the MDI 14 generates color pixel data for display on a graphics display device (not shown). The VRAM frame buffer 12 transmits pixel data over a video bus 15 to the MDI 14 on the rising edge of a video shift clock signal (VSCLK) 20.

In the current embodiment, the video bus 15 is 128 bits wide, which enables transfer of data for multiple pixels in parallel to the MDI 14. The MDI 14 processes pixels in three pixel depth modes: 32 bit mode, 16 bit mode, and 8 bit mode. In 32 bit mode, the MDI 14 receives 32 bit wide pixel data over the video bus 15. In 16 bit mode, 16 bit wide pixels are received, while in 8 bit mode 8 bit wide pixels are received. Thus, in 32 bit mode, four pixels are transferred to the MDI 14 in parallel over the video bus 15 on the rising edge the VSCLK 20. In 16 bit mode, eight pixels are transferred in parallel, and in 8 bit mode, sixteen pixels are transferred in parallel over the video bus 15.

After performing look-up table functions and special pixel functions on the pixel data received over the video bus 15, the MDI 14 transfers color pixel data to the DAC 16 over a pixel bus 17. The DAC 16 converts the digital color pixel data into analog signals, and thereby generates video signals 19 for the display device. The video signals 19 comprised red, green, and blue video signals, as well as sync signals for the display device.

Figure 2:
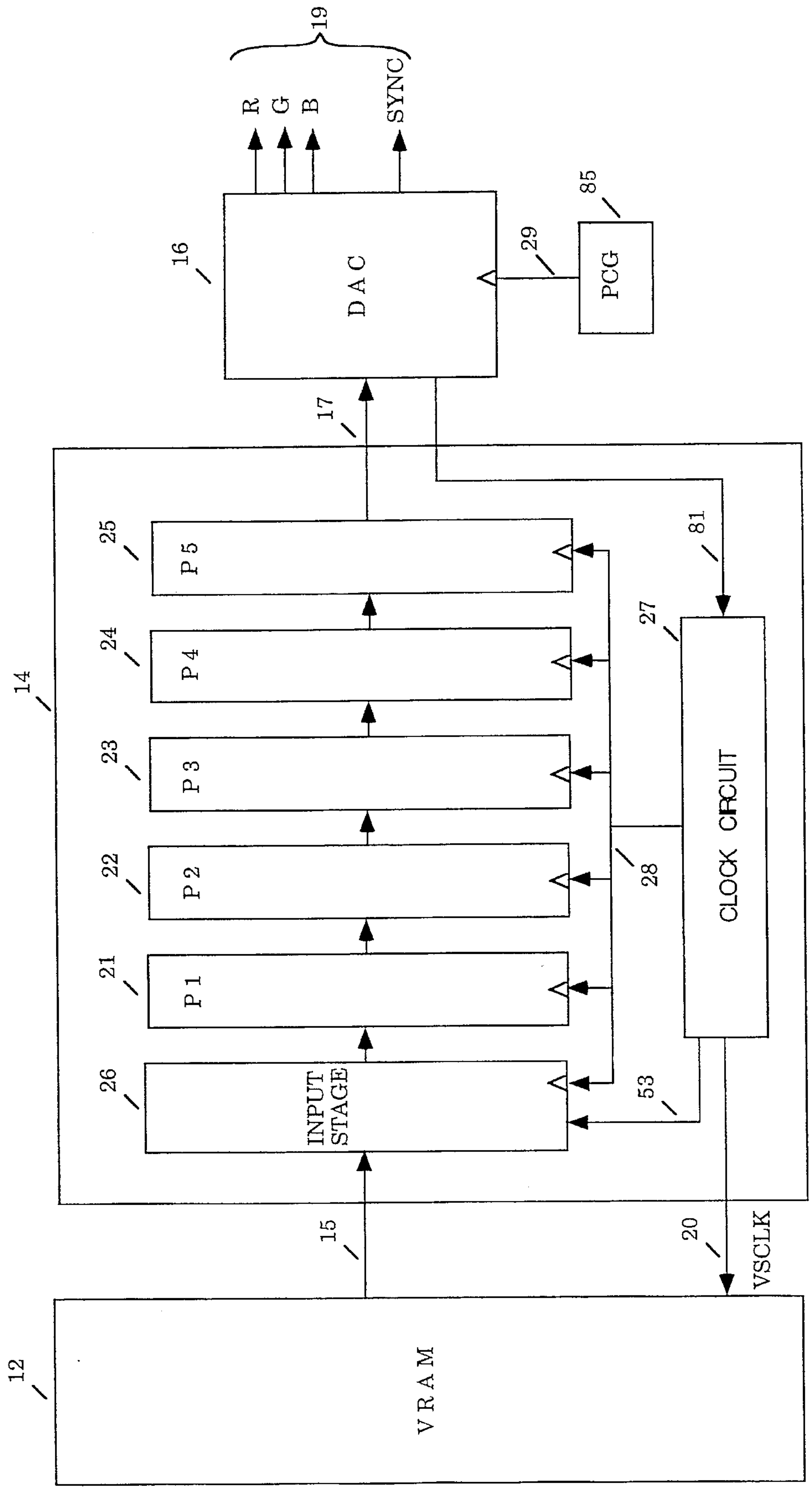
FIG. 2 is a block diagram of the memory display interface, which is comprised primarily of an input stage, a pixel processing pipeline, and a clock circuit.

Referring now to FIG. 2, a block diagram of the MDI 14, which is comprised primarily of an input stage 26, a pixel processing pipeline, and a clock circuit 27 is shown. The pixel processing pipeline processes the pixel data received from the VRAM frame buffer 12, and is comprised of a set of pixel processing stages 21–25. The clock circuit 27 generates the clock signals necessary to sequence the pixel data from the video bus 15, through the input stage 26 and the pixel processing pipeline 21–25, and over the pixel bus to the DAC 16. The clock signals are generated to accomplish the variable pixel rates and pixel depths in accordance with the teachings of the present invention.

Pixel data from the VRAM frame buffer 12 is received over the video bus 15 by the input stage 26. Thereafter, the pixel data is sequenced into the pixel processing pipeline 21–25, which processes four pixels in parallel for all three pixel depth modes. The final pixel processing stage 25 contains an output multiplexer for transferring the color pixel data to the DAC 16 over the pixel bus 17. The pixel processing stage 25 multiplexes the color pixel data from four parallel pixels to two parallel pixels for transfer to the DAC 16 over the pixel bus 17.

The video signals 19 from the DAC 16 to the display device are synchronized to a video clock 29, which is generated by a programmable clock generator (PCG) 85. The DAC 16 receives the video clock 29 from the PCG 85, and generates a pixel clock signal 81. The pixel clock signal 81 is synchronized to the video clock 29, and runs at one half the frequency of the video clock 29.

The clock circuit 27 receives the pixel clock 81 from the DAC 16, and generates the VSCLK 20, a pipeline clock 28, and an input control signal 53. The VSCLK 20, the pipeline clock 28, and the input control signal 53 are synchronized to the pixel clock 81 and the video clock 29.

The rising edge of the VSCLK 20 causes the VRAM frame buffer 12 to transfer 128 bits of pixel data to the MDI 14 over the video bus 15. The input control signal 53 sequences the pixel data through the input stage 26, and into the pixel processing pipeline 21–25 according to the pixel depth mode and the frequency of the video clock 29. The pipeline clock 28 is used to sequence the pixel data from the input stage 26 through the pixel processing pipeline 21–25.

The VSCLK 20, the pipeline clock 28, the input control signal 53 and the pixel clock 81 are derived from the video clock 29, and are synchronized to the video clock 29. The frequencies of the VSCLK 20, are determined by the pixel rate required by the displayed device, and by the depth of the pixel data. The frequencies of the pipeline clock 28, and the pixel clock 81 are determined by the pixel rate required by the display device. The pixel rate required by the display device is determined by the frequency of the video clock 29.

For example, a 1600×1280 resolution display device running at 76 Hz requires the video clock 29 frequency of 216 MHz. The DAC 16 divides the video clock 29 by 2, and generates the pixel clock 81 at 108 MHz. The pixel clock 81 runs at one half the frequency of the video clock 29 because color pixel data for two pixels is transferred in parallel over the pixel bus 17, while the video signals 19 transmit one pixel to the display device.

The clock circuit 27 receives the pixel clock 81, and generates the pipeline clock 28 at 54 MHz, which is one half the frequency of the pixel clock 81. The pipeline clock 28 runs at one half the frequency of the pixel clock 81, and at one fourth the frequency of the video clock 29, because pixel data for four pixels is processed in parallel through the pixel processing pipeline 21–25.

The clock circuit 27 generates the VSCLK 20 at a frequency which depends on the pixel depth mode. Four pixels are transferred in parallel over the video bus 15 in 32 bit mode, while four pixels are processed in parallel through the pixel processing pipeline 21–25. Therefore the VSCLK 20 and the pipeline clock 28 run at the same frequency in 32 bit mode. In this example for 32 bit mode, the VSCLK 20 is generated and 54 MHz, which is equal to the frequency of the pipeline clock 28.

In 16 bit mode, eight pixels are transferred in parallel over the video bus 15, while only four pixels are processed in parallel through the pixel processing pipeline 21–25. As a consequence, the clock circuit 27 generates the VSCLK 20 at one half the frequency of the pipeline clock 28, or 27 MHz in this example. In 8 bit mode, sixteen pixels are transferred in parallel over the video bus 15, while four pixels are processed in parallel through the pixel processing pipeline 21–25. Thus, for 8 bit mode, the clock circuit 27 generates the VSCLK 20 at one fourth the frequency of the pipeline clock, or 13.5 MHz.

For another example, a 1280×1024 resolution display device running at 76 Hz requires the video clock 29 frequency of 135 MHz. The DAC 16 generates the pixel clock 81 at 67.5 MHz, which is one half the frequency of the video clock 29. The clock circuit 27 generates the pipeline clock 28 at 33.75 MHz, which is one half the frequency of the pixel clock 81. The clock circuit 27 generates the VSCLK 20 at 33.75 MHz in 32 bit mode, at 16.875 MHz in 16 bit mode, and 8.4375 MHz in 8 bit mode.

Figure 3:
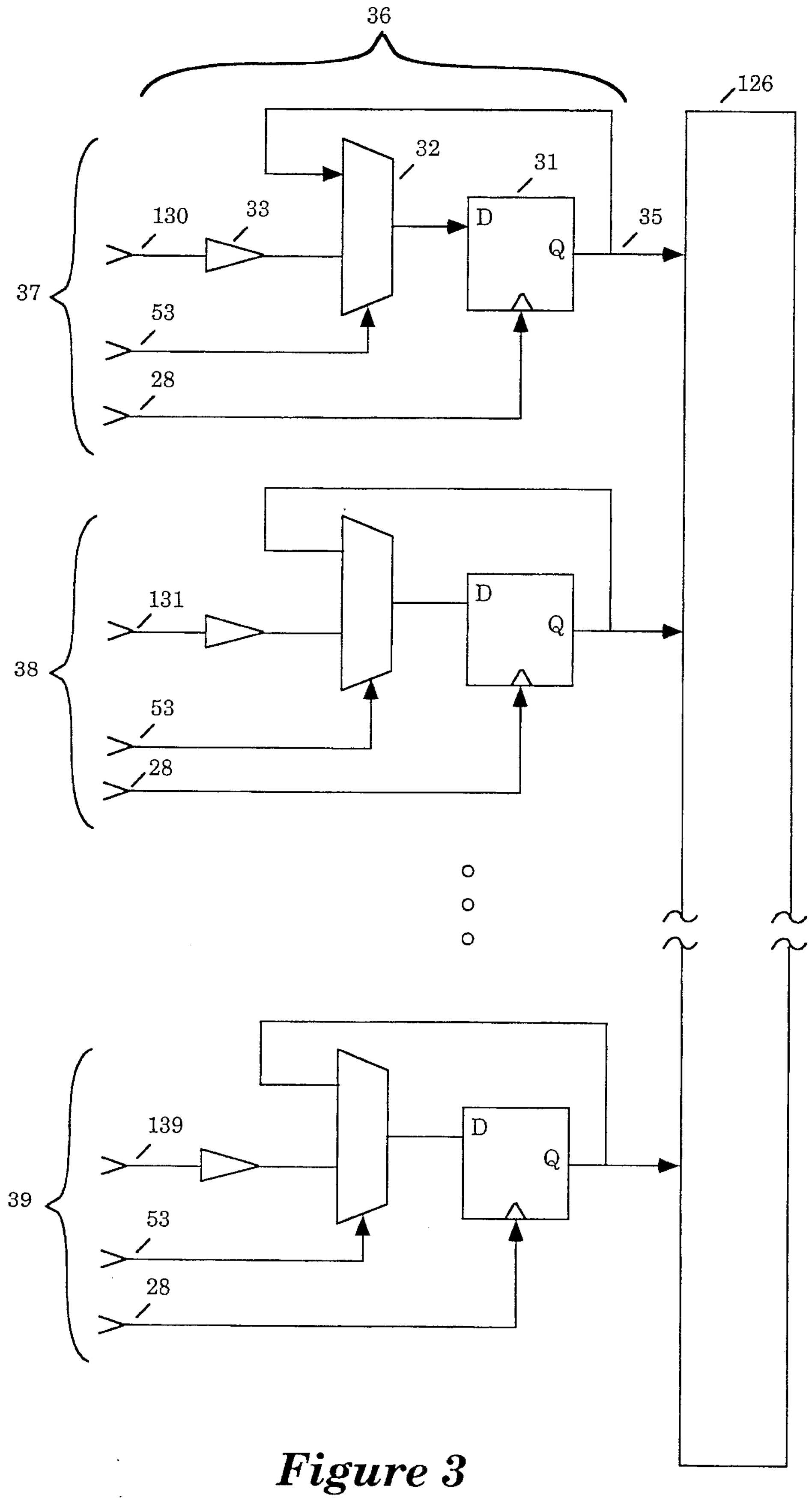
FIG. 3 is a detailed illustration of the input stage, which receives an input control signal and a pipeline clock, and sequences the pixel data received over the video bus into the pixel processing pipelines.

FIG. 3 is a detailed illustration of the input stage 26. The input stage 26 receives the input control signal 53 and the pipeline clock 28, and sequences the pixel data received over the video bus 15 into the pixel processing pipeline 21–25. The input stage 26 is comprised of a set of 128 pipeline feed circuits 36, and an input multiplexer circuit 126. Each of the 128 signal lines of the video bus 15 is coupled to one of the pipeline feed circuits 36. For example, a pipeline feed circuit 37 receives the highest order bit of the pixel data received over the data bus 15. A pipeline feed circuit 38 receives the next to highest order bit, and a pipeline feed circuit 39 receives the lowest order bit.

Each of the pipeline feed circuits 36 is comprised of a one bit data latch, a 2-to-1 multiplexer, and a one bit TTL to CMOS buffer. For example, the pipeline feed circuit 37 is comprised of a buffer 33, a multiplexer 32, and a data latch 31. Input line 130 is coupled to receive pixel data over the highest order bit of the video bus 15. The multiplexer 32 selectively couples either the received pixel bit 130, or a last pixel bit 35, to the D input of the data latch 31 according to the logical state of the input control signal 53. The output of the multiplexer 32 is loaded into the data latch 31 on the rising edge of the pipeline clock 28.

The pipeline feed circuits 36 hold the data received over the video bus 15 for one, two, or four pipeline clock 28 cycles, depending on the pixel depth mode. Each of the pipeline feed circuits 36 function in a substantially similar manner, which will be described with reference to the pipeline feed circuit 37.

In 32 bit mode, data for four pixels is transferred over the video bus 15, while the pixel processing pipeline 21–25 accepts data for four pixels in parallel. Thus, the pixel processing pipeline 21–25 can accept the 128 bits of pixel data concurrently. Thus, the input control signal 53 causes the multiplexer 32 to couple the pixel bit 130 to the D input of the data latch 31. Thereafter, the pipeline clock 28 latches the pixel bit into the data latch 31, and the pixel bit is transferred to the input multiplexer circuit 126 over the signal line 35. The pixel bit on signal line 35 is held for the input multiplexer circuit 126 until the next rising edge of the pipeline clock 28 loads the pixel bit for the next set of pixel data received over the video bus 15.

In 16 bit mode, data for eight pixels is transferred over the video bus 15, while the pixel processing pipeline 21–25 accepts data for only four pixels in parallel. Thus, the pixel data received over the video bus 15 must be held for two pipeline clock 28 cycles to enable the pixel processing pipeline 21–25 to accept the data for all eight pixels in two sequential groups of four pixels. The input control signal 53 causes the multiplexer 32 to couple the received pixel bit 130 to the D input of the data latch 31. The pipeline clock 28 latches the pixel bit into the data latch 31, and the pixel bit is coupled to the input multiplexer circuit 126 over the signal line 35. The pixel bit on the signal line 35 is fed back into an input of the multiplexer 32. To hold the pixel data, the input control signal 53 causes the multiplexer 32 to couple the pixel bit on the signal line 35 back to the input of the data latch 31, and pixel bit is again clocked into the data latch 31 on the next rising edge of the pipeline clock 28.

In 8 bit mode, data for sixteen pixels is transferred over the video bus 15, while the pixel processing pipeline 21–25 accepts data for only four pixels in parallel. Thus, the pixel data received over the video bus 15 must be held for four pipeline clock 28 cycles for the pixel processing pipeline 21–25 to accept the data for all sixteen pixels in four sequential groups of four pixels. To hold the pixel data, the input control signal 53 causes the multiplexer 32 to couple the pixel bit on the signal line 35 back to the input of the data latch 31, and pixel bit is clocked back into the data latch 31 on four sequential rising edges of the pipeline clock 28.

Figure 4:
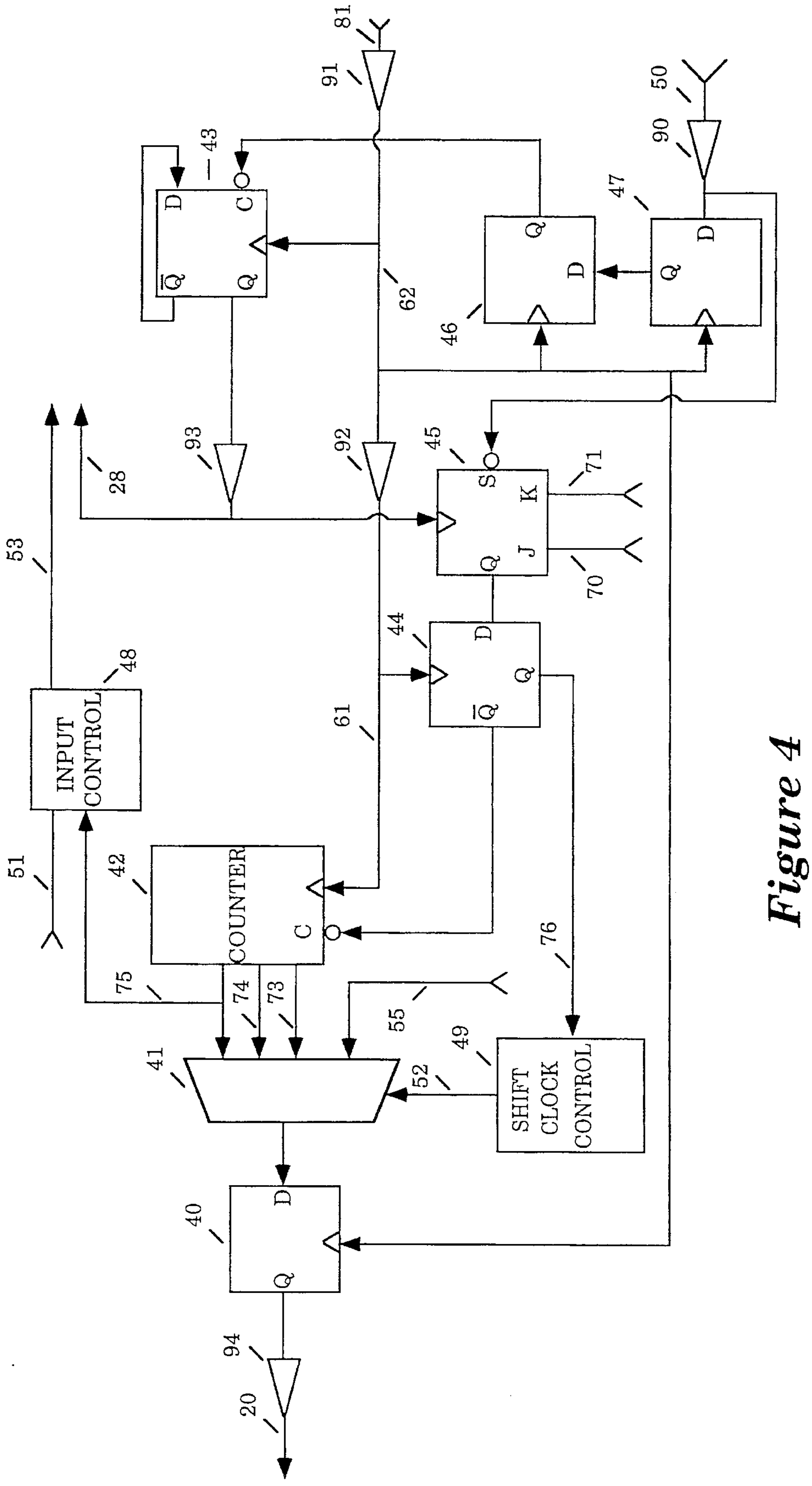
FIG. 4 is a detailed illustration of the clock circuit, which generates the clock signals to support the variable pixel rates and pixel depths in accordance with the teachings of the present invention.

FIG. 4 is a detailed illustration of the clock circuit 27, which generates the clock signals necessary to support the variable pixel rates and pixel depths in accordance with the teachings of the present invention. The clock circuit 27 receives the pixel clock 81 from the DAC 16, and generates the VSCLK 20, the pipeline clock 28, and the input control signal 53.

A data latch 43 divides the pixel clock 81 by 2, in order to generate the pipeline clock 28. The pixel clock 81 is received by a buffer 91. The output of the buffer 91 is coupled to the clock input of the data latch 43. The data latch 43 is arranged as a divide by 2 latch, with the Q not output fed back to the D input. The Q output of the data latch 43 is coupled to the driver 93 to generate the pipeline clock 28.

The pixel clock 81 synchronizes a counter 42, which generates clock outputs 73–75 at the frequencies required for 32 bit mode, 16 bit mode, and 8 bit mode. The pixel clock 81 from the output of the buffer 91 is coupled to the input of a buffer 92. The output 61 of the buffer 92 is coupled to the clock input of the counter circuit 42. The counter 42 is a free running counter synchronized to the pixel clock 81. The clock output 73 runs at one half the frequency of the pixel clock 81, which is equal to the frequency of the pipeline clock 28. The clock output 74 runs at one fourth the frequency of the pixel clock 81, and the clock output 75 runs at one eighth the frequency of the pixel clock 81.

To generate the VSCLK 20, a multiplexer 41 selects one of the clock outputs 73–75 to drive a data latch 40, which is synchronized by the pixel clock 81. The output of the multiplexer 41 is coupled to the D input of the data latch 40. The Q output of the data latch 40 is buffered by the driver 94 to provide the drive necessary to transmit the VSCLK 20 to the VRAM frame buffer 12.

A shift clock control circuit 49 generates mux control signals 52 to select one of the inputs to the multiplexer 41 according to the pixel depth mode. In 32 bit mode, the mux control signals 52 select the clock output 73 for coupling to the D input of the data latch 40. Thus, the VSCLK 20 runs at one half the rate of the pixel clock 81, which is equal to the rate of the pipeline clock 28, in 32 bit mode. In 16 bit mode, the mux control signals 52 select the clock output 74, resulting in the VSCLK 20 running at one fourth the rate of the pixel clock 81. In 8 bit mode, the mux control signals 52 select the clock output 75, resulting in the VSCLK 20 running at one eighth the rate of the pixel clock 81.

The mux control signals 52 select a vertical inhibit signal 55 for coupling to the D input of the data latch 40 during blanking intervals of the display device. The selection of the vertical inhibit signal 55 inhibits the VSCLK 20 to ensure that pixel data is not received from the VRAM frame buffer 12 during blanking. The vertical inhibit signal is also selected to generate an early VSCLK 20 at the end of blanking, which ensures that valid pixel data is available on the video bus 15 for the first pipeline clock 28 after blanking.

An input control circuit 48 generates the input control signal 53 for the pipeline feed circuits 36. Also, the input control circuit 48 contains a set of drivers to transmit the input control signal 53 to the multiplexer control An input control circuit 48 generates the input control signal 53 for the input of all 128 pipeline feed circuits.

A J–K flip flop 45 and a data latch 44 are used to reset the counter circuit 42 and inhibit the VSCLK during a blanking interval. A set blanking signal 70 is coupled to the J input of the flip flop 45, and a clear blanking signal 71 is coupled to the K input of the flip flop 45. The flip flop 45 is synchronized by the pipeline clock 28, while the data latch 44 is synchronized by the output of the buffer 92, which is driven by the buffered pixel clock 81. If the set blanking signal 70 is high, the Q output of the flip flop 45 is latched by the data latch 44. The Q not output of the data latch 44 clears the counter 42, and the Q output generates an inhibit SCLK 76, which causes the shift clock control circuit 49 to inhibit the VSCLK 20 by selecting the vertical inhibit signal 55. If the clear blanking signal 71 is high, then the C input to the counter 42 is released, and the inhibit SCLK 76 is released.

A master reset signal 50 for the MDI 14 is used to reset the pipeline clock 28, and inhibit the VSCLK 20. The master reset signal 50 is received by a buffer 90, and synchronized through a pair of data latches 46 and 47. When a master reset signal 50 is asserted, the Q output of the data latch 46 clears the data latch 43, which resets the pipeline clock 28. The output of the buffer 90 is coupled to the S input of the flip flop 45, which is set when the master reset signal is asserted, thereby clearing the counter 42 and inhibiting the VSCLK 20 in the manner discussed above.

In the foregoing specification the invention has been described with reference specific exemplary embodiments thereof. It will, however, be evident that various modifications and changes may be made thereto without departing from the broader spirit and scope of the invention as set forth in the appended claims. The specifications and drawings are accordingly to be regarded as illustrative rather than restrictive.

What is claimed is:

1. A circuit for synchronizing pixel data being processed through a memory display interface, comprising:

circuitry for sensing a pixel clock signal, the pixel clock signal synchronizing a plurality of color pixels for transfer over a pixel bus;

circuitry for generating a pipeline clock signal synchronous with the pixel clock signal, the pipeline clock signal synchronizing a pixel processing pipeline including a plurality of pixel processing stages to propagate a plurality of pixels through the memory interface;

circuitry for generating a shift clock signal, the shift clock signal enabling transfer of the plurality of pixels from a VRAM frame buffer to the memory display interface over a video bus;

circuitry for sequencing the plurality of pixels into the pixel processing pipeline according to the frequency of the pixel clock signal and a predetermined pixel depth.

2. The circuit of claim 1, wherein the pixel clock is synchronized to a video clock, such that the video clock synchronizes video signals for a display device.

3. The circuit of claim 1, wherein the pipeline clock signal has a predetermined frequency m times the pixel clock, such that pixels are processed in parallel through the pixel processing pipeline for every c color pixels transferred in parallel over the pixel bus, wherein "m" and "c" are whole numbers.

4. The circuit of claim 1, wherein p of the pixels are transferred in parallel over the video bus for each of the shift clock signals, such that p is a nearest whole number equal to a predetermined video bus width divided by the predetermined pixel depth.

5. The circuit of claim 1, wherein the means for sequencing the pixels comprises:

a plurality of signal buffers for receiving the pixels over the video bus;

a plurality of data latches for storing the pixels, each data latch having an input and an output and a clock coupled to the pipeline clock;

a plurality of multiplexers for selectively coupling the pixels and the outputs of the data latches to the inputs of the data latches according to an input select signal;

multiplexer circuit coupled to receive the outputs of the data latches and feed the pixel processing pipeline.

6. A method for synchronizing pixel data processing through a memory display interface, comprising the steps of:

sensing a pixel clock signal, the pixel clock signal synchronizing a plurality of color pixels transferred over a pixel bus;

generating a shift clock signal, the shift clock signal enabling transfer of a first plurality of pixels from a VRAM frame buffer to the memory display interface over a video bus;

sequencing the first plurality of pixels into a pixel processing pipeline according to the frequency of the pixel clock signal and a predetermined pixel depth; and generating a pipeline clock signal, synchronous with the pixel clock signal, for synchronizing a second plurality of pixels being transferred through the pixel processing pipeline in a memory display interface.

7. The method of claim 6, wherein the pixel clock is synchronized to a video clock, such that the video clock synchronizes video signals for a display device.

8. The method of claim 6, wherein the pipeline clock has a frequency m times the pixel clock, such that pixels are processed in parallel through the pixel processing pipeline for every c color pixels transferred in parallel over the pixel bus, wherein "m" and "c" are whole numbers.

9. The method of claim 6, wherein p of the pixels are transferred in parallel over the video bus for each of the shift clock signals, such that p is a nearest whole number equal to a predetermined video bus width divided by the predetermined pixel depth.

10. A computer system comprising an error correction coding memory controller;

a memory device, coupled to the error correction coding memory controller, for storing pixel data;

a memory display interface, coupled to the memory device, for performing operations on the pixel data to generate color pixel data, the memory display interface including a circuit for synchronizing the pixel data being operated thereon, said circuit including circuitry for sensing a pixel clock signal, the pixel clock signal synchronizing the color pixel data being output from the memory display interface, circuitry for generating a pipeline clock signal synchronous with the pixel clock signal, the pipeline clock signal synchronizing a pixel processing pipeline including a plurality of pixel processing stages to propagate the pixel data through the memory display interface circuitry for generating a shift clock signal, the shift clock signal enabling transfer of the pixel data from a VRAM frame buffer to the memory display interface over a video bus, and circuitry for sequencing the pixel data into the pixel processing pipeline according to the frequency of the pixel clock signal and a predetermined pixel depth;

a converter, coupled to the memory display interface, for converting the color pixel data into video signals; and a display, coupled to the converter, for receiving the video signals for display.

11. The computer system of claim 10, wherein the pixel clock is synchronized to a video clock, such that the video clock synchronizes video signals for a display device.

12. The computer system of claim 10, wherein the pipeline clock signal has a predetermined frequency m times the pixel clock, such that pixels are processed in parallel through the pixel processing pipeline for every c color pixels transferred in parallel over the pixel bus, wherein "m" and "c" are whole numbers.

13. The computer system of claim 10, wherein p of the pixels are transferred in parallel over the video bus for each of the shift clock signals, such that p is a nearest whole number equal to a predetermined video bus width divided by the predetermined pixel depth.

14. The computer system of claim 10, wherein the means for sequencing the pixels comprises:

a plurality of signal buffers for receiving the pixels over the video bus;

a plurality of data latches for storing the pixels, each data latch having an input and an output and a clock coupled to the pipeline clock;

a plurality of multiplexers for selectively coupling the pixels and the outputs of the data latches to the inputs of the data latches according to an input select signal;

multiplexer circuit coupled to receive the outputs of the data latches and feed the pixel processing pipeline.

15. The computer system according to claim 10, wherein the memory device is a video random access memory device.

16. The computer system according to claim 15, wherein the converter is a digital to analog converter for generating the video signals being data and sync signals.

* * * * *

UNITED STATES PATENT AND TRADEMARK OFFICE
CERTIFICATE OF CORRECTION

PATENT NO. : 5,502,837
DATED : March 26, 1996
INVENTOR(S) : Hoffert

It is certified that error appears in the above-identified patent and that said Letters Patent is hereby corrected as shown below:

In column 7, claim 1 at line 41, please delete " interface " and insert -- display interface -- .

Signed and Sealed this

Sixteenth Day of March, 1999

*Attest:*

Q. TODD DICKINSON

*Attesting Officer* *Acting Commissioner of Patents and Trademarks*